(No Model.)
L. P. STINE.
HOPPLE.
No. 488,849. Patented Dec. 27, 1892.
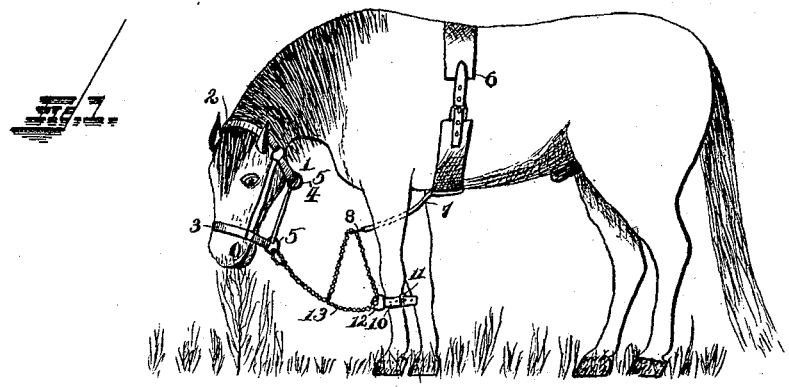
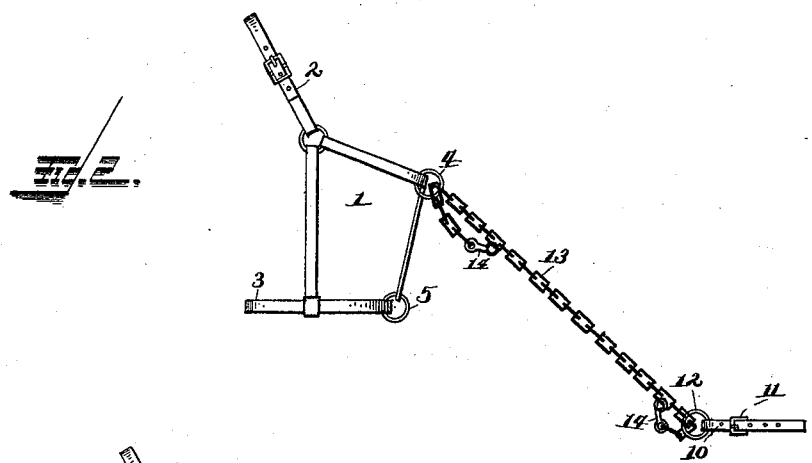
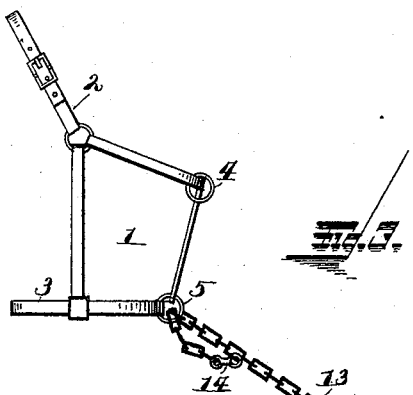
Witnesses
C. S. Frye
G. T. Myers
L. P. Stine.
Inventor
By Hopkins & Atkins
Attorneys

UNITED STATES PATENT OFFICE.

LAFAYETTE PETER STINE, OF ROSEVILLE, OHIO.

HOPPLE.

SPECIFICATION forming part of Letters Patent No. 488,849, dated December 27, 1892.

Application filed July 23, 1892. Serial No. 440,997. (No model.)

*To all whom it may concern:*

Be it known that I, LAFAYETTE PETER STINE, of Roseville, county of Muskingum, and State of Ohio, have invented certain new and useful Improvements in Hopples, of which the following is a specification, reference being had to the accompanying drawings.

The object of my invention is to produce an improved form of hopple, which is cheap, durable, and effective, and is arranged so as to give the least inconvenience to the animal.

In the accompanying drawings, Figure 1 is a side view of a horse with my hopple attached, showing the preferred form of a hopple; Fig. 2 is a similar view, showing a modified arrangement of the hopple; Fig. 3 is a similar view, showing still another way of attaching the hopple.

Referring to the figures on the drawings, 1 indicates a halter, provided with a neck strap 2, and nose strap 3.

4 indicates a ring upon the neck strap, and 5 indicates a similar arrangement of the nose strap. The halter, as will be perceived, is of ordinary construction.

6 indicates a surcingle, and 7 a strap provided with a ring 8 at its outer end. The strap is adapted to be secured under the belly of the animal, and in use is of sufficient length to pass between his fore legs.

10 indicates a leg strap, preferably padded and is preferably provided with a buckle 11 for fastening it in place around the lower fore leg of an animal.

12 indicates a ring upon the padded leg strap.

13 indicates a hoppel chain, which preferably consists of an ordinary chain provided at its opposite ends with snap hooks 14 for ready adjustment. As shown in Fig. 1 of the drawings the chain is properly adjusted in the ring on the nose strap, as illustrated, and is then passed through the ring upon the padded leg strap and the surcingle strap, and is fastened at its end to one of the links in the body of the chain, as illustrated. If preferred, on some animals the hopple chain may be fastened to the ring on the neck strap, or to the ring on the nose strap, as illustrated, respectively in Figs. 2 and 3, and passed through the ring of the padded leg strap, dispensing with the surcingle and strap. As above indicated, however, I prefer the form illustrated in Fig. 1. It will be readily perceived that by fastening the head of the horse to his fore leg he will be unable to raise his head for leaping, and may be turned loose in a field to graze but be prevented from raising his head to damage standing crops, for instance corn therein. By the arrangement shown in Figs. 2 and 3 he might be able to relieve the strain somewhat on his head by raising his foot, which an intelligent animal would soon learn. By the arrangement shown in Fig. 1, however, an attempt to do this would maintain the strain upon the chain on account of the chains being loosely passed through the ring in the padded leg strap and the ring in the surcingle strap. For some purposes the form shown in Figs. 2 and 3 would be sufficient, but that shown in Fig. 1 is adapted to give perfect security for all purposes.

What I claim is:—

The combination with a halter, of a surcingle strap and leg strap, of a connecting piece attached at one end to the halter and connected loosely to the leg strap and the surcingle strap, and fastened to the connecting piece at its opposite end, substantially as described.

In testimony of all which I have hereunto subscribed my name.

LAFAYETTE PETER STINE.

Witnesses:
WM. DUNN,
D. W. ZIEGLER.